United States Patent
Hegde et al.

(10) Patent No.: US 11,495,995 B2
(45) Date of Patent: Nov. 8, 2022

(54) ADVANCED OVERVOLTAGE PROTECTION STRATEGY FOR WIRELESS POWER TRANSFER

(71) Applicant: STMicroelectronics Asia Pacific Pte Ltd, Singapore (SG)

(72) Inventors: Supriya Raveendra Hegde, Singapore (SG); Chee Weng Cheong, Singapore (SG)

(73) Assignee: STMicroelectronics Asia Pacific Pte Ltd, Singapore (SG)

(*) Notice: Subject to any disclaimer, the term of this patent is extended or adjusted under 35 U.S.C. 154(b) by 154 days.

(21) Appl. No.: 17/004,689

(22) Filed: Aug. 27, 2020

(65) Prior Publication Data
US 2021/0091597 A1 Mar. 25, 2021

Related U.S. Application Data

(60) Provisional application No. 62/904,115, filed on Sep. 23, 2019.

(51) Int. Cl.
H02J 50/10 (2016.01)
H02M 7/219 (2006.01)
H02M 1/32 (2007.01)
H02J 7/00 (2006.01)

(52) U.S. Cl.
CPC ............ *H02J 50/10* (2016.02); *H02M 1/32* (2013.01); *H02J 7/00308* (2020.01); *H02M 7/219* (2013.01)

(58) Field of Classification Search
CPC ............ B60L 53/12–126; B60L 53/34; B60L 53/38–39; H01F 38/14; H02M 1/32–327; H02M 7/219–2195; H02J 7/00308
See application file for complete search history.

(56) References Cited

U.S. PATENT DOCUMENTS

| | | | |
|---|---|---|---|
| 6,373,790 B1* | 4/2002 | Fujisawa | H02J 7/0048 327/494 |
| 2010/0165686 A1* | 7/2010 | Matzberger | H02M 7/219 363/127 |
| 2015/0097439 A1* | 4/2015 | Kohout | H02J 7/00308 307/104 |
| 2015/0263511 A1* | 9/2015 | Sandner | H02H 7/1252 363/53 |
| 2016/0043562 A1 | 2/2016 | Lisi et al. | |
| 2016/0111892 A1* | 4/2016 | Joehren | H02M 1/32 307/104 |

(Continued)

*Primary Examiner* — Rexford N Barnie
*Assistant Examiner* — David A Shiao
(74) *Attorney, Agent, or Firm* — Crowe & Dunlevy

(57) ABSTRACT

A wireless power receiving circuit includes a transistor based rectifier receiving an AC input voltage, and control logic receiving an overvoltage signal. The control logic generates control signals for controlling turn on of transistors within the transistor based rectifier based upon the overvoltage signal so as to cause the transistor based rectifier to produce a rectified output voltage from the AC input voltage. A comparator compares the rectified output voltage to a reference voltage and asserts the overvoltage signal if the rectified output voltage is greater than the reference voltage. In response to assertion of the overvoltage signal, the control logic asserts the control signals to simultaneously turn on all transistors of the transistor based rectifier.

22 Claims, 3 Drawing Sheets

(56) References Cited

U.S. PATENT DOCUMENTS

| | | |
|---|---|---|
| 2016/0190816 A1 | 6/2016 | Rehm |
| 2016/0336808 A1* | 11/2016 | Liu ..................... H02M 7/219 |
| 2017/0104368 A1 | 4/2017 | Radke et al. |
| 2017/0373605 A1 | 12/2017 | Dela Cruz et al. |
| 2018/0090995 A1* | 3/2018 | Arasaki .................. H02J 50/12 |
| 2018/0131234 A1 | 5/2018 | Uchimoto |
| 2018/0254631 A1 | 9/2018 | White, II et al. |
| 2019/0006885 A1* | 1/2019 | Danilovic ............... H02J 50/60 |
| 2019/0013728 A1* | 1/2019 | Liu ........................ H02M 1/32 |
| 2019/0165611 A1* | 5/2019 | Miyazawa .............. H02M 7/06 |
| 2020/0136421 A1* | 4/2020 | Kim ........................ H02J 50/60 |
| 2020/0274395 A1* | 8/2020 | Hwang ................. H02M 7/213 |

\* cited by examiner

ADVANCED OVERVOLTAGE PROTECTION STRATEGY FOR WIRELESS POWER TRANSFER

RELATED APPLICATION

This application claims priority to United States Provisional Application for Patent 62/904,115, filed Sep. 23, 2019, the contents of which are incorporated by reference in their entirety to the maximum extent allowable under the law.

TECHNICAL FIELD

This application is directed to the field of wireless power transmission, and in particular, to circuits and techniques for protecting a device receiving power wirelessly from overvoltage situations caused by the receipt of the wireless power.

BACKGROUND

In a typical wireless charging system 10 such as is shown in FIG. 1, a transmitter system 12 powers a primary coil 13 with alternating current, resulting in an oscillating magnetic field at the primary coil 13. A secondary coil 19 in a receiver 18 placed in proximity to this primary coil 13 will resonate with the field due to magnetic coupling between the primary coil 13 and secondary coil 19, leading to a corresponding alternating current in the secondary coil 19 according to Faraday's law of induction. By rectifying the alternating current in the secondary coil 19 using a rectification circuit within a power pick-up unit 20, output power DC power can be produced for use in powering a load 21.

A concern that arises with such typical wireless charging systems 10 is that devices within the receiver 18 may be damaged if the output power (e.g., output voltage) exceeds a safe operating voltage. Therefore, the output voltage is monitored and actions are taken to help ensure that the voltage does not exceed the safe operating voltage.

One conventional technique that attempts to ensure that the output voltage does not exceed the safe operating voltage is to stop rectification of the alternating current induced in the secondary coil when the output voltage exceeds the safe operating voltage. This technique works by shorting the inputs of the rectification circuit to ground to thereby change the impedance of the receiver, with the result being that the rectifier receives less power from the receiver.

While this technique works as desired in some applications, it is insufficient for situations where the power transfer from the transmitter exceeds 20 W, because the impedance reduction provided by shorting the inputs of the rectification circuit is insufficient. In particular, the power received at the rectifier is dissipated in the switches used to short the inputs of the rectification circuit to ground, and therefore the impedance modification of the receiver is a function of the on-resistance of the switches. Since the amount of power dissipated in the receiver is a function of the impedance at the input of the rectifier, the insufficient impedance modification provided by this technique in situations where the power transfer from the transmitter exceeds 20 W leads to excessive device operating temperature. This excessive device operating temperature may then cause malfunction of other devices within the receiver, and many such devices may be present because the receiver may be incorporated within devices such as a smartphone, a smartwatch, or a wireless earbud system.

SUMMARY

Disclosed herein is a wireless power receiving circuit including: a transistor based rectifier receiving an AC input voltage; control logic receiving an overvoltage signal and generating control signals for transistors of the transistor based rectifier based upon the overvoltage signal to cause the transistor based rectifier to produce a rectified output voltage from the AC input voltage; a comparator comparing the rectified output voltage to a reference voltage and asserting the overvoltage signal if the rectified output voltage is greater than the reference voltage; and wherein the control logic asserts the control signals to turn on each transistor of the transistor based rectifier in response to assertion of the overvoltage signal.

The transistor based rectifier may be a transistor based single phase full wave rectifier having four transistors. In this case, the control logic asserts the control signals to turn on the four transistors of the transistor based single phase full wave rectifier in response to assertion of the overvoltage signal (either by turning on all four transistors simultaneously, or turning on the four transistors asynchronously but with the result being that all four transistors are eventually on at the same time), and the control logic asserts two of the control signals to switchingly turn on two of the four transistors of the transistor based single phase full wave rectifier at a time in an absence of assertion of the overvoltage signal.

The control signals may be first, second, third, and fourth control signals. The transistor based rectifier may include: a first n-channel transistor having a drain coupled to a third node, a source coupled to a first node, and a gate coupled to the first control signal; a third n-channel transistor having a drain coupled to the first node, a source coupled to ground, and a gate coupled to the third control signal; a second n-channel transistor having a drain coupled to the third node, a source coupled to a second node, and a gate coupled to the second control signal; and a fourth n-channel transistor having a drain coupled to the second node, a source coupled to ground, and a gate coupled to the fourth control signal. The control logic may assert the first, second, third, and fourth control signals to turn on the first, second, third, and fourth transistors in response to assertion of the overvoltage signal. In addition, the control logic may switch between asserting the first and fourth control signals, and asserting the second and third control signals, in an absence of assertion of the overvoltage signal.

A power supply circuit may generate an output signal from the rectified output voltage, and a load may be powered by the output signal. The load may be a battery charging circuit and/or a battery.

A low dropout amplifier may generate a low voltage output for powering the control logic.

A power receiving coil may wirelessly receive transmitted power and produce therefrom the AC input voltage.

Also disclosed herein is a method aspect. The method includes: receiving power wirelessly; rectifying the received power to produce a rectified voltage using a single phase full wave rectifier having four transistors by alternating between turning on different pairs of transistors from the four transistors; comparing the rectified voltage to a reference voltage, and: a) if the rectified voltage is greater than the reference voltage, turning on the four transistors of the single phase full wave rectifier; and b) if the rectified voltage is less than the reference voltage, continue alternating between turning on different pairs of transistors from the four transistors.

The method may also include generating a power signal from the rectified voltage and powering a battery charging circuit using the power signal.

The method may also include generating a logic circuit power signal from the rectified voltage and using the logic circuit power signal to power control logic that performs a) and b).

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Figure 1:
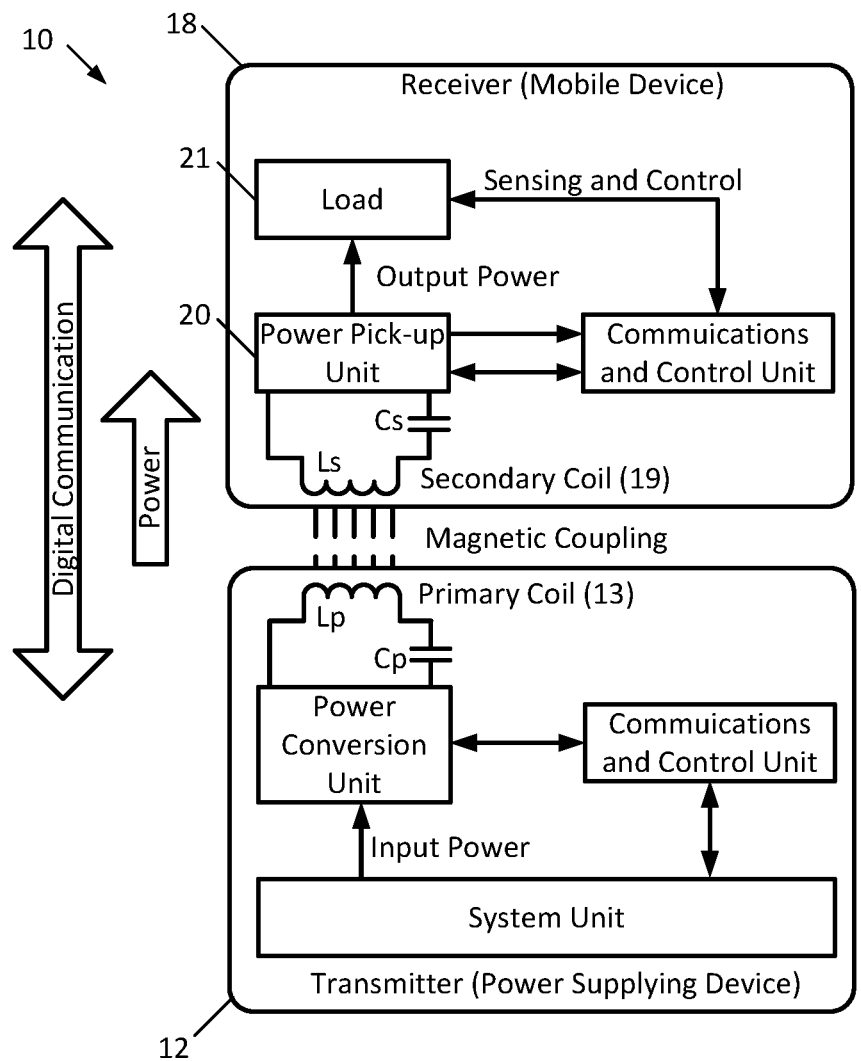
FIG. 1 is a block diagram of a prior art wireless charging system.
Figure 2:
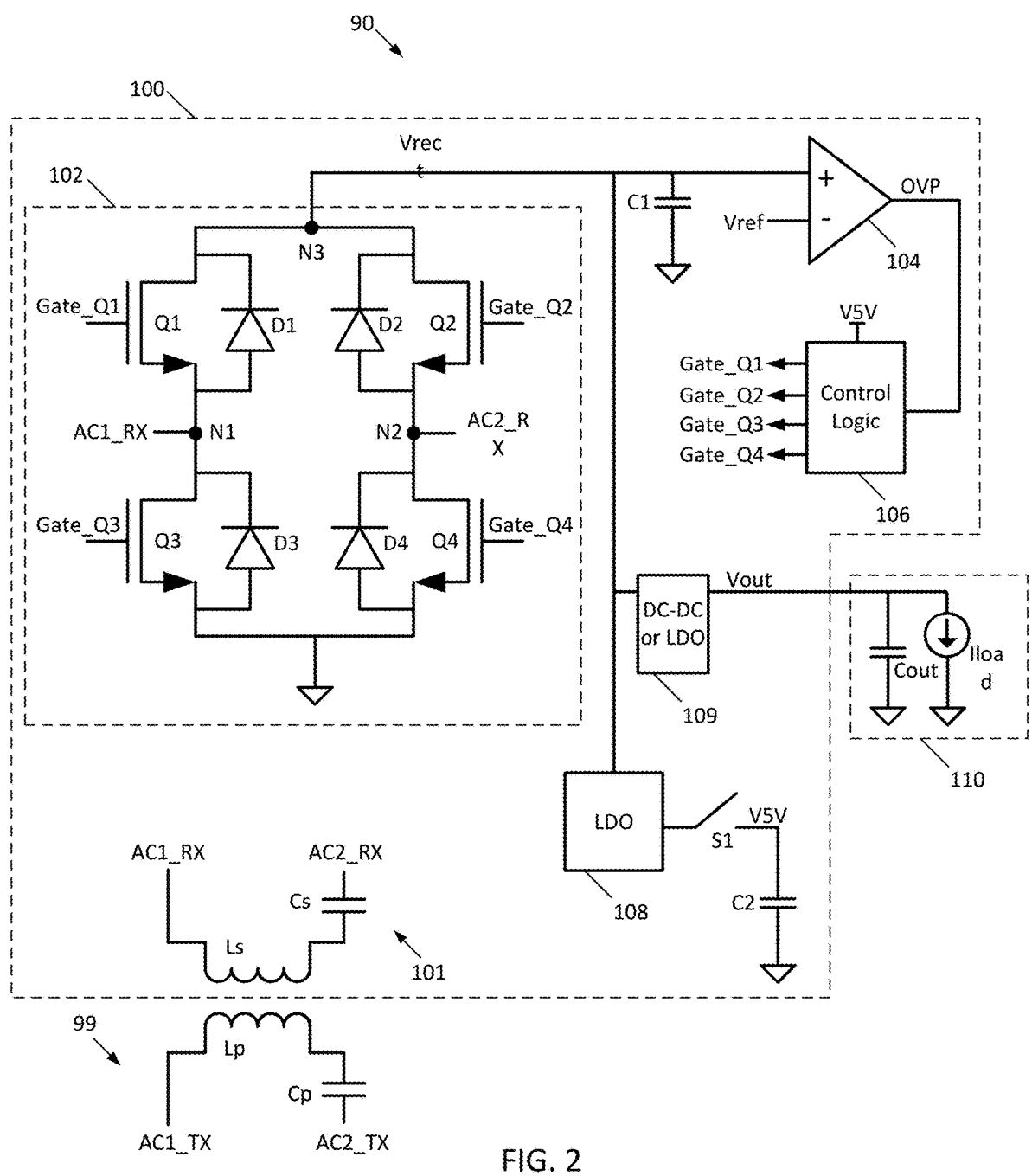
FIG. 2 is a schematic block diagram of a receiver of a wireless charging system in accordance with this disclosure, in which overvoltage protection circuitry is present to protect the receiver from overvoltages caused by received wireless power.

Now described with reference to FIG. 2 is an electronic device 90, such as a smartphone, tablet, smartwatch, or a wireless earbud system. The electronic device 90 includes a receiver 100 for receiving power wirelessly and providing power to a load 110 (e.g., a battery and/or a battery charging circuit). The receiver includes a secondary coil 101 (shown schematically as inductor Ls and capacitor Cs) for receiving power wirelessly from a primary coil 99 (shown schematically as inductor Lp and capacitor Cp) associated with a transmitter (not shown). The receiver 100 also includes a single phase full wave rectifier 102 having input nodes N1 and N2 connected to the ends AC1_RX and AC2_RX of the secondary coil 101 for receiving the AC signal transmitted to the secondary coil 101 by the primary coil 99 of the transmitter.

The single phase full wave rectifier 102 is comprised of n-channel transistors Q1 and Q3 connected in series between node N3 and ground, and n-channel transistors Q2 and Q4 connected in series between node N3 and ground. In particular, Q1 has its drain coupled to node N3, its source connected to node N1, and its gate connected to the Gate_Q1 signal; Q3 has its drain connected to node N1, its source connected to ground, and its gate connected to the Gate_Q3 signal; Q2 has its drain connected to node N3, its source connected to node N2, and its gate connected to the Gate_Q2 signal; and Q4 has its drain connected to node N2, its source connected to ground, and its gate connected to the Gate_Q4 signal. In addition, a diode D1 has its cathode connected to the drain of Q1 and its anode connected to the source of Q1; a diode D3 has its cathode connected to the drain of Q3 and its anode connected to the source of Q3; a diode D2 has its cathode connected to the drain of Q2 and its anode connected to the source of Q2; and a diode D4 has its cathode connected to the drain of Q4 and its anode connected to the source of Q4. These diodes may in some cases be intrinsic to the transistors Q1-Q4, for example resulting from the junctions therein.

The receiver 100 also includes a comparator 104 having its non-inverting terminal connected to node N3, its inverting terminal connected to a reference voltage Vref, and its output OVP (standing for overvoltage protection, for example) connected to control logic circuitry 106. A capacitor C1 is coupled between the non-inverting input of the comparator 104 and ground. The control logic circuitry 106 receives the output OVP of the comparator 104 as input, is powered by a 5V voltage V5V from the low dropout amplifier (LDO) 108, and outputs the control signals Gate_Q1, Gate_Q2, Gate_Q3, and Gate_Q4.

The LDO 108 is connected to node N3 for power, and switchingly connected to a first terminal of capacitor C2 through switch S1 to produce the 5V5 voltage. A second terminal of capacitor C2 is connected to ground.

Note that the LDO 108 is a low voltage amplifier used for powering the control logic 10. A second amplifier, such as a DC-DC converter or LDO 10, produces a regulated output voltage Vout from the rectified voltage Vrect and uses this output voltage to power a load 110, such as charging a battery or battery charging circuit incorporated into the device 90 into which the receiver 100 is incorporated. Iload is the load current (e.g., current to the battery or battery charging circuit), and Vout*Iload yields the total power provided to the load. Vout is less than Vrect in magnitude.

In operation, the single phase full wave rectifier 102 rectifies the input AC signal to produce a rectified voltage Vrect at node N3, which is continuously compared to the reference voltage Vref by the comparator 104. If the rectified voltage Vrect does not exceed the reference voltage Vref, the overvoltage signal OVP output by the comparator 104 remains deasserted, and therefore the control logic 106 continues to switch the transistors Q1-Q4 appropriately (e.g., one high side transistor of one side and one low side transistor of the other side being on at the same time, such as Q1 and Q4, or Q2 and Q3) as understood by those of skill in the art for rectification of the input AC voltage to produce the rectified voltage Vrect.

However, if the rectified voltage Vrect exceeds the reference voltage Vref, the comparator 104 asserts the overvoltage signal OVP at its output, which is passed to the control logic 106. When the control logic 106 receives the asserted overvoltage signal OVP, the control logic 106 asserts Gate_Q1, Gate_Q2, Gate_Q3, and Gate_Q4 to turn on transistors Q1-Q4 simultaneously (this switching on of Q1-Q4 may be simultaneous, or may occur progressively until all transistors Q1-Q4 are on at the same time), which is asynchronous to normal switching of the single phase full wave rectifier 102.

Due to all transistors Q1-Q4 being turned on, the reflected impedance at the receiver 100 is increased, less power is received from the primary coil of the transmitter, and Vrect is reduced. Note that at this point, the switch S1 will open, and capacitor C2 will hold the voltage 5V5 so as to cause the control logic 106 to maintain the control signals Gate_Q1, Gate_Q2, Gate_Q3, and Gate_Q4 asserted so as to keep the transistors Q1-Q4 on.

Figure 3:
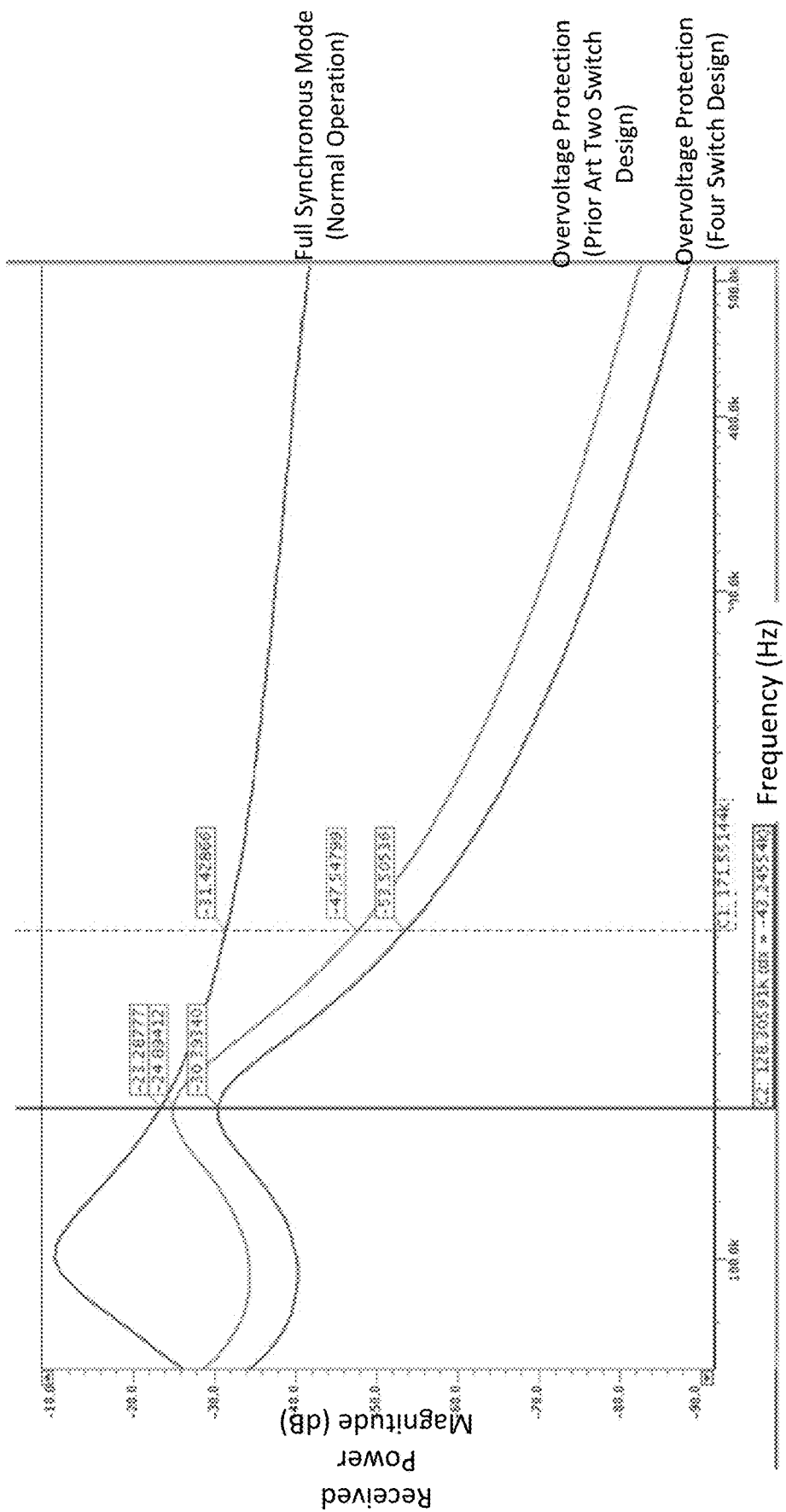
FIG. 3 is a graph showing power transferred over a range of frequencies for a normal operating condition (no overvoltage protection engaged), for an overvoltage condition in which a prior art overvoltage protection circuit is employed, and for an overvoltage condition in which the overvoltage protection circuitry of FIG. 2 is employed.

The robust overvoltage protection provided by the receiver 100 can be seen in FIG. 3, where it can be seen that the embodiment of FIG. 2 lowers the received power drastically compared to the received power during operation, and lowers the received power by approximately 6 dB compared to the prior art design.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A wireless power receiving circuit, comprising:
a transistor based rectifier configured to receive an AC input voltage at first and second nodes, the transistor based rectifier comprising a transistor based single phase full wave rectifier having a first high-side transistor coupled between the first node and a third node, a first low-side transistor coupled between the third node and ground, a second high-side transistor coupled between the second node and the third node, and a second low-side transistor coupled between the third node and ground;
control logic configured to receive an overvoltage signal and generate control signals for controlling actuation of the first high-side transistor, the first low-side transistor, the second high-side transistor, and the second low-side transistor so as to cause the transistor based rectifier to produce a rectified output voltage at the third node from the AC input voltage; and
a comparator configured to compare the rectified output voltage to a reference voltage and assert the overvoltage signal when the rectified output voltage is greater than the reference voltage;
wherein the control logic asserts the control signals to cause the first high-side transistor, the first low-side transistor, the second high-side transistor, and the second high-side transistor to be on simultaneously in response to assertion of the overvoltage signal; and
wherein the control logic asserts two of the control signals to switchingly turn on either the first high-side transistor and the second low-side transistor or the second high-side transistor and the first low-side transistor in an absence of assertion of the overvoltage signal.

2. The wireless power receiving circuit of claim 1, wherein the control signals comprise first, second, third, and fourth control signals; and wherein:
the first high-side transistor comprises a first n-channel transistor having a drain coupled to the third node, a source coupled to the first node, and a gate coupled to the first control signal;
the first low-side transistor comprises a third n-channel transistor having a drain coupled to the first node, a source coupled to ground, and a gate coupled to the third control signal;
the second high-side transistor comprises a second n-channel transistor having a drain coupled to the third node, a source coupled to the second node, and a gate coupled to the second control signal; and
the second low-side transistor comprises a fourth n-channel transistor having a drain coupled to the second node, a source coupled to ground, and a gate coupled to the fourth control signal.

3. The wireless power receiving circuit of claim 2, wherein the control logic is configured to assert the first, second, third, and fourth control signals to turn on the first, second, third, and fourth n-channel transistors in response to assertion of the overvoltage signal.

4. The wireless power receiving circuit of claim 3, wherein the control logic is configured to switch between asserting the first and fourth control signals, and asserting the second and third control signals, in an absence of assertion of the overvoltage signal.

5. The wireless power receiving circuit of claim 1, further comprising a power supply circuit generating an output signal from the rectified output voltage.

6. The wireless power receiving circuit of claim 5, further comprising a load powered by the output signal.

7. The wireless power receiving circuit of claim 6, wherein the load comprises a battery charging circuit.

8. The wireless power receiving circuit of claim 6, wherein the load comprises a battery.

9. The wireless power receiving circuit of claim 5, further comprising a low dropout amplifier generating a low voltage output for powering the control logic.

10. The wireless power receiving circuit of claim 1, further comprising a power receiving coil wirelessly receiving transmitted power and producing therefrom the AC input voltage.

11. The wireless power receiving circuit of claim 1, further comprising a low dropout amplifier configured to receive the rectified output voltage as input, a capacitor, and a switch connected between an output of the low dropout amplifier and the capacitor; wherein the switch is configured to connect the output of the low dropout amplifier to the capacitor so that a low voltage output is formed across the capacitor, in an absence of assertion of the overvoltage signal, the low voltage output for powering the control logic.

12. The wireless power receiving circuit of claim 1, wherein the control logic asserts the control signals to cause the first high-side transistor, the first low-side transistor, the second high-side transistor, and the second low-side transistor to be on simultaneously in response to assertion of the overvoltage signal by progressively asserting different ones of the control signals over time until each control signal is asserted in response to assertion of the overvoltage signal, thereby progressively turning on different ones of the first high-side transistor, the first low-side transistor, the second high-side transistor, and the second low-side transistor over time until each of the first high-side transistor, the first low-side transistor, the second high-side transistor, and the second low-side transistor is simultaneously on.

13. A method, comprising:
receiving power wirelessly;
rectifying the received power to produce a rectified voltage using a single phase full wave rectifier having two high-side transistors and two low-side transistors by alternating between turning on different pairs of transistors from among the two high-side transistors and the two low-side transistors; and
comparing the rectified voltage to a reference voltage, and:
a) when the rectified voltage is greater than the reference voltage, causing the two high-side transistors and the two low-side transistors to be turned on simultaneously; and
b) when the rectified voltage is less than the reference voltage, continuing to alternate between turning on different pairs of transistors from among the two high-side transistors and the two low-side transistors.

14. The method of claim 13, further comprising generating a power signal from the rectified voltage and powering a battery charging circuit using the power signal.

15. The method of claim 13, further comprising generating a logic circuit power signal from the rectified voltage and using the logic circuit power signal to power control logic that performs a) and b).

16. An electronic device, comprising:
a battery;
a battery charging circuit;
a receiver coil receiving wirelessly transmitted power and generating an AC input voltage therefrom; and
a wireless power receiving circuit powering the battery charging circuit, the wireless power receiving circuit comprising:
a single phase full wave rectifier receiving the AC input voltage at first and second nodes, the single phase full wave rectifier having a first high-side transistor coupled between the first node and a third node, a first low-side transistor coupled between the third node and ground, a second high-side transistor coupled between the second node and the third node, and a second low-side transistor coupled between the third node and ground;
control logic receiving an overvoltage signal and generating control signals for controlling actuation of the first high-side transistor, the first low-side transistor, the second high-side transistor, and the second low-side transistor based upon the overvoltage signal to cause the single phase full wave rectifier to produce a rectified output voltage at the third node from the AC input voltage;
a comparator comparing the rectified output voltage to a reference voltage and asserting the overvoltage signal when the rectified output voltage is greater than the reference voltage;
wherein the control logic asserts the control signals to cause the first high-side transistor, the first low-side transistor, the second high-side transistor, and the second low-side transistor to turn on simultaneously in response to assertion of the overvoltage signal; and
a power supply circuit generating power for powering the battery charging circuit from the rectified output voltage to thereby cause the battery charging circuit to charge the battery.

17. The electronic device of claim 16, wherein the control signals comprise first, second, third, and fourth control signals; and wherein:
the first high-side transistor comprises a first n-channel transistor having a drain coupled to the third node, a source coupled to the first node, and a gate coupled to the first control signal;
the first low-side transistor comprises a third n-channel transistor having a drain coupled to the first node, a source coupled to ground, and a gate coupled to the third control signal;
the second high-side transistor comprises a second n-channel transistor having a drain coupled to the third node, a source coupled to the second node, and a gate coupled to the second control signal; and
the second low-side transistor comprises a fourth n-channel transistor having a drain coupled to the second node, a source coupled to ground, and a gate coupled to the fourth control signal;
wherein the AC input signal is coupled across the first and second nodes.

18. The electronic device of claim 17, wherein the control logic switches between asserting the first and fourth control signals, and asserting the second and third control signals, in an absence of assertion of the overvoltage signal to thereby cause the single phase full wave rectifier to produce the rectified output voltage from the AC input voltage.

19. A wireless power receiving circuit, comprising:
a transistor based rectifier having first and second nodes configured to receive an input AC signal and first and second outputs configured to generate a DC output, the transistor based rectifier comprising a transistor based single phase full wave rectifier having a first high-transistor coupled between the first node and a third node, a first low-side transistor coupled between the third node and ground, a second high-side transistor coupled between the second node and the third node, and a second low-side transistor coupled between the third node and ground;
a comparator having a non-inverting terminal coupled to the first output of the rectifier, an inverting terminal coupled to a reference voltage, and an output; and
control logic having an input coupled to the output of the comparator and generating control signals for the rectifier;
wherein the control logic asserts the control signals to cause the first high-side transistor, first low-side transistor, second high-side transistor, and second low-side transistor be on simultaneously, based upon receiving a first output level from the comparator; and
wherein the control logic is configured to assert two of the control signals to switchingly turn on either the first high-side transistor and the second low-side transistor or the second high-side transistor and the first low-side transistor based upon receiving a second output level from the comparator.

20. The wireless power receiving circuit of claim 19, wherein the control signals comprise first, second, third, and fourth control signals; and wherein:
the first high-side transistor comprises a first n-channel transistor having a drain coupled to the third node, a source coupled to the first node, and a gate coupled to the first control signal, wherein the third node is the first output of the rectifier;
the first low-side transistor comprises a third n-channel transistor having a drain coupled to the first node, a source coupled to ground, and a gate coupled to the third control signal, wherein the second output of the rectifier is coupled to the source of the third n-channel transistor;
the second high-side transistor comprises a second n-channel transistor having a drain coupled to the third node, a source coupled to the second node, and a gate coupled to the second control signal; and
the second low-side transistor comprises a fourth n-channel transistor having a drain coupled to the second node, a source coupled to ground, and a gate coupled to the fourth control signal, wherein the second output of the rectifier is coupled to the source of the fourth n-channel transistor.

21. The wireless power receiving circuit of claim 20, wherein the control logic is configured to assert the first, second, third, and fourth control signals to turn on the first, second, third, and fourth n-channel transistors in response to receiving a first output level from the comparator.

22. The wireless power receiving circuit of claim 21, wherein the control logic is configured to switch between asserting the first and fourth control signals, and asserting the second and third control signals in response to receiving the second output level from the comparator.

\* \* \* \* \*